(12) United States Patent
Shue (10) Patent No.: US 7,878,027 B2
(45) Date of Patent: Feb. 1, 2011

(54) GLASSWARE FORMING MACHINE BLOWHEAD ARM ASSEMBLY

(75) Inventor: Larry N. Shue, Woodville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 375 days.

(21) Appl. No.: 11/986,691

(22) Filed: Nov. 26, 2007

(65) Prior Publication Data
US 2009/0133443 A1 May 28, 2009

(51) Int. Cl.
C03B 9/36 (2006.01)
(52) U.S. Cl. .......................................... 65/261; 65/300
(58) Field of Classification Search .................... 65/300, 65/301, 261, 233, 262, 263
See application file for complete search history.

(56) References Cited

U.S. PATENT DOCUMENTS

| | | | |
|---|---|---|---|
| 1,654,731 A | | 1/1928 | Ingle |
| 1,911,119 A | * | 5/1933 | Ingle ........................... 65/219 |
| 2,282,848 A | | 5/1942 | Berthold |
| 2,627,702 A | * | 2/1953 | Lowe ........................... 65/262 |
| 3,472,642 A | | 10/1969 | Irwin |
| 3,871,856 A | * | 3/1975 | Trahan ........................ 65/261 |
| 4,466,821 A | | 8/1984 | Irwin et al. |
| 4,509,969 A | * | 4/1985 | Abbott ........................ 65/300 |
| 4,610,713 A | | 9/1986 | Clegg |
| 4,678,494 A | * | 7/1987 | Nebelung et al. ............. 65/261 |
| 4,704,154 A | | 11/1987 | Hirt |
| 6,460,377 B1 | * | 10/2002 | Connors et al. ............... 65/158 |

FOREIGN PATENT DOCUMENTS

GB         2317610 A         4/1998

* cited by examiner

Primary Examiner—Matthew J. Daniels
Assistant Examiner—Yana Belyaev (57) ABSTRACT

A glassware forming machine blowhead arm assembly includes a one-piece blowhead arm body having at least one longitudinal air passage and a plurality of lateral air passages connected to the longitudinal passage. A blowhead chuck is removably received in a first end of each lateral passage and a cap is threaded into the second end of each lateral passage spaced from the associated blowhead chuck. A spring is captured in compression between each cap and an associated blowhead chuck biasing the blowhead chuck in a direction out of the lateral passage and away from the cap. In an exemplary embodiment of the disclosure adapted for use in conjunction with so-called isolated finish cooling blowheads, there are first and second longitudinal air passages extending through the blowhead arm body separately from each other, and separate air inputs in the body respectively coupled to the first and second longitudinal passages. Each lateral air passage is separately connected to the longitudinal air passages, and the blowhead chucks have separate air passages for feeding blow air and finish cooling air to a blowhead mounted in the chuck.

11 Claims, 7 Drawing Sheets

GLASSWARE FORMING MACHINE BLOWHEAD ARM ASSEMBLY

The present disclosure is directed to a blowhead arm assembly for positioning blowheads over blow molds of a glassware forming machine.

BACKGROUND AND SUMMARY OF THE DISCLOSURE

A general object of the present disclosure is to provide a blowhead arm assembly for a glassware forming machine, which is easier and less expensive to assemble and maintain than are blowhead arm assemblies in the prior art. The present disclosure embodies a number of aspects that can be implemented separately from or in combination with each other.

A glassware forming machine blowhead arm assembly, in accordance with one aspect of the present disclosure, includes a one-piece blowhead arm body having at least one longitudinal air passage and a plurality of lateral air passages connected to the longitudinal passage. A blowhead chuck is removably received in a first end of each lateral passage and a cap is threaded into the second end of each lateral passage spaced from the associated blowhead chuck. A spring is captured in compression between each cap and an associated blowhead chuck biasing the blowhead chuck in a direction out of the lateral passage and away from the cap. In an exemplary embodiment of the disclosure adapted for use in conjunction with so-called isolated finish cooling blowheads, there are first and second longitudinal air passages extending through the blowhead arm body separately from each other, and separate air inputs in the body respectively coupled to the first and second longitudinal passages. Each lateral air passage is separately connected to the longitudinal air passages, and the blowhead chucks have separate air passages for feeding blow air and finish cooling air to a blowhead mounted in the chuck. Each longitudinal air passage preferably is machined into the blowhead arm body, and the assembly preferably includes at least one expansion plug received in an end of each longitudinal passage closing the end of each longitudinal air passage.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
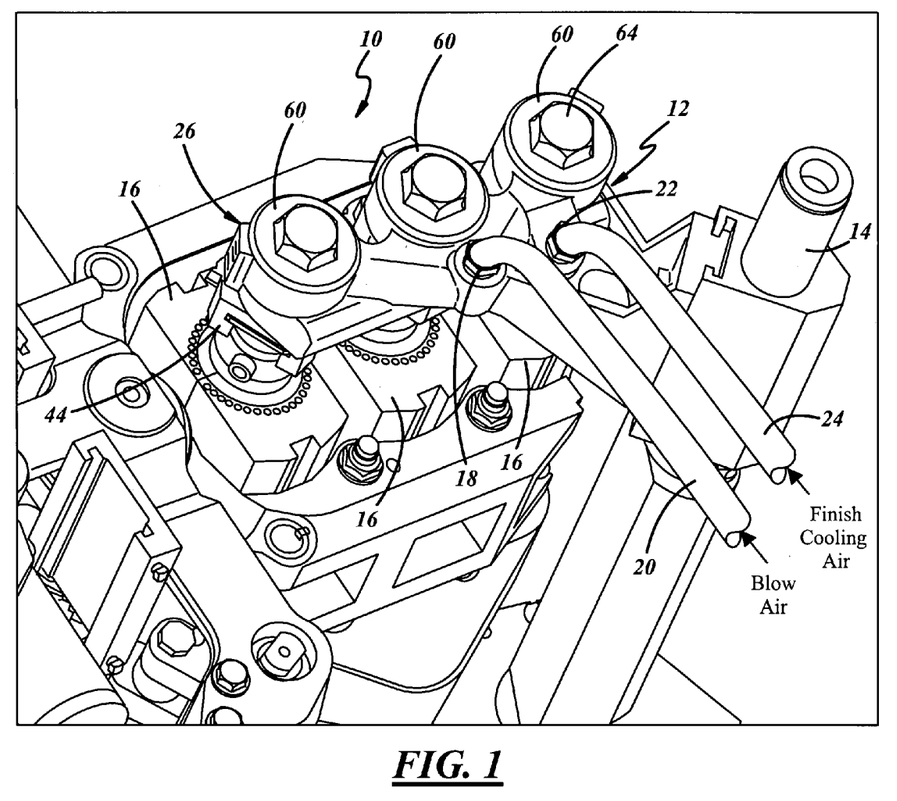
FIG. 1 is a fragmentary perspective view of a glassware forming machine that includes a blowhead arm assembly in accordance with an exemplary embodiment of the present disclosure.
Figure 2:
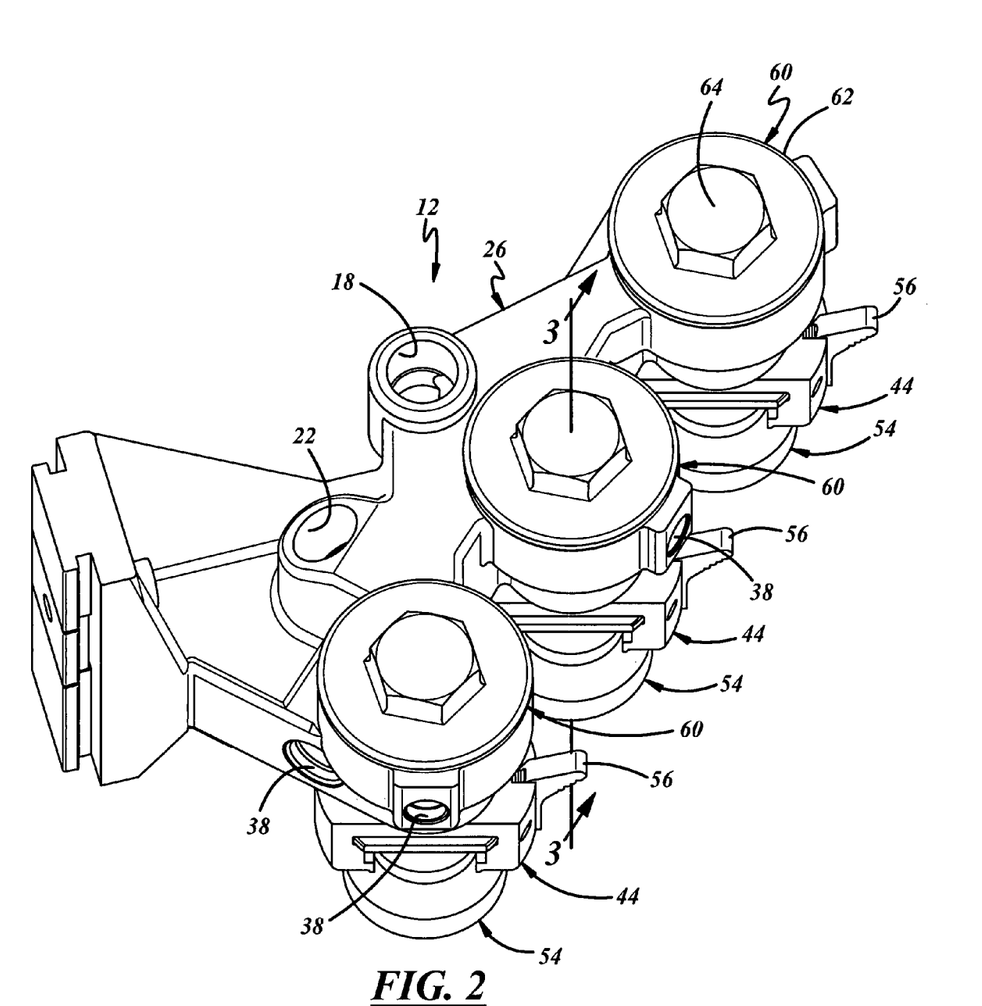
FIG. 2 is a perspective view of the blowhead arm assembly illustrated in FIG. 1.

FIG. 1 illustrates a portion of a glassware forming machine 10 that includes a blowhead arm assembly 12 in accordance with an exemplary embodiment of the present disclosure. Blowhead arm assembly 12 may be mounted on a post 14 for rotational movement with respect to a plurality of blow molds 16, and for longitudinal movement toward and away from the open ends of the blow molds. The exemplary forming machine 10 in FIG. 1 is a so-called triple machine having three blow molds 16. In the illustrated exemplary embodiment of the disclosure, blowhead arm assembly 12 has a first port 18 for connection by a suitable conduit 20 to a source of container blow air and a second port 22 for connection by a suitable conduit 24 to a source of finish cooling air. Thus, blowhead arm assembly 12 is adapted for use in so-called isolated finish cooling blowhead systems. However, the blowhead arm assembly of the present disclosure is equally and well adapted for use in conjunction with blowheads that provide finish cooling air from the container blow air rather than from a separate finish cooling air input. The term "air" is employed by way of description and not limitation, and gases other than air could be used for container blowing and/or finish cooling.

Referring to FIGS. 2-5, blowhead arm assembly 12 includes a one-piece blowhead arm body 26. Body 26 preferably is a one-piece metal casting that is machined (e.g., drilled) in a post-casting operation to provide one or more longitudinal air passages. Blowhead body 26 has at least one longitudinal air passage 28 and a plurality of lateral passages 30, 32, 34. In the orientation of use illustrated in FIG. 1, longitudinal passage 28 extends lengthwise of blowhead arm body 26 generally in a horizontal direction, while lateral passages 30, 32, 34 extend in a vertical direction. Longitudinal passage 28 connects blow air input port 18 to the upper ends of lateral passages 30-34. Blowhead arm body 26 also preferably includes a second longitudinal passage 36 that connects finish cooling air input port 22 with the mid portions lateral passages 30-34. Longitudinal passages 28, 36 are separate and isolated from each other between respective input ports 18, 22 and lateral passages 30-34. Longitudinal passages 28, 36 are machined in blow arm casting 26, preferably by drilling after casting, and ends of the longitudinal passages are closed by expansion plugs 38 where needed. It also is noted that, if isolated finish cooling is not needed in a particular application, isolated finish cooling input port 22 on blow arm casting 26 can be closed by a suitable expansion plug. The use of expansion plugs rather than pipe plugs simplifies and reduces the cost of the blowhead arm assembly, and the expansion plugs do not require tapped holes.

Figure 3:
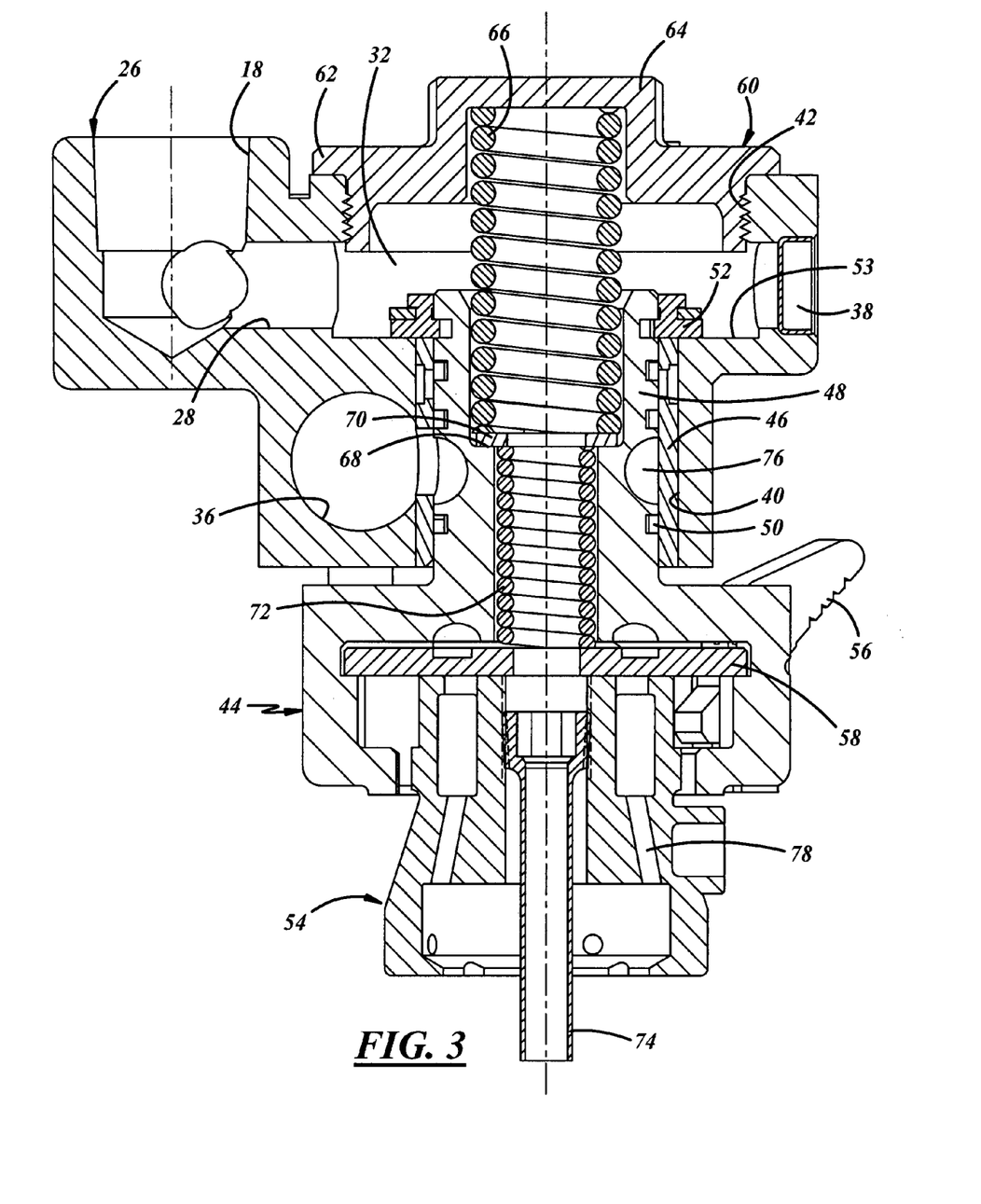
FIG. 3 is a sectional view taken substantially along the line 3-3 in FIG. 2.
Figure 4:
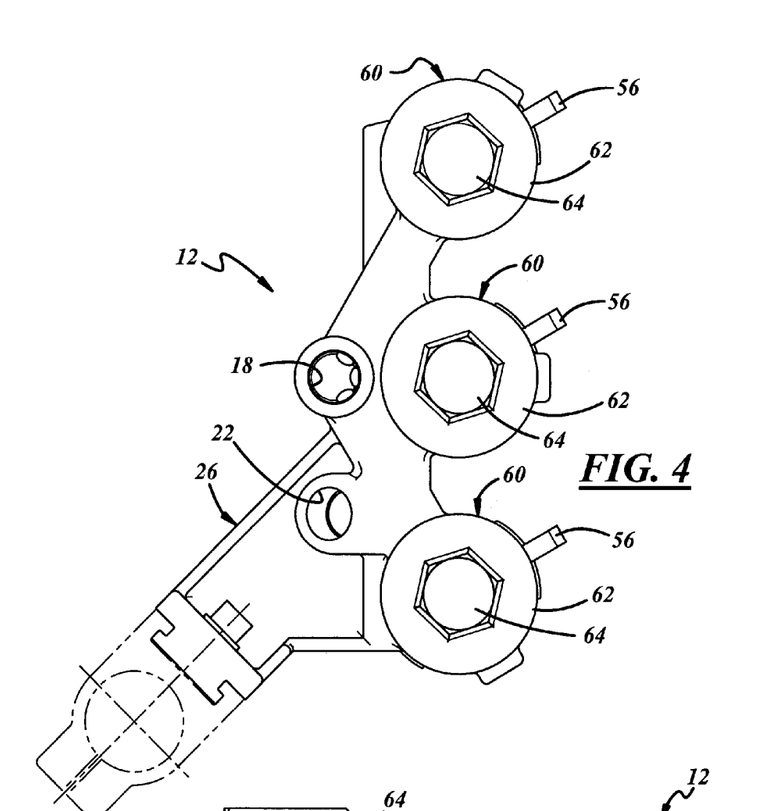
FIG. 4 is a top plan view of the blowhead arm assembly in FIGS. 1-3.
Figure 5:
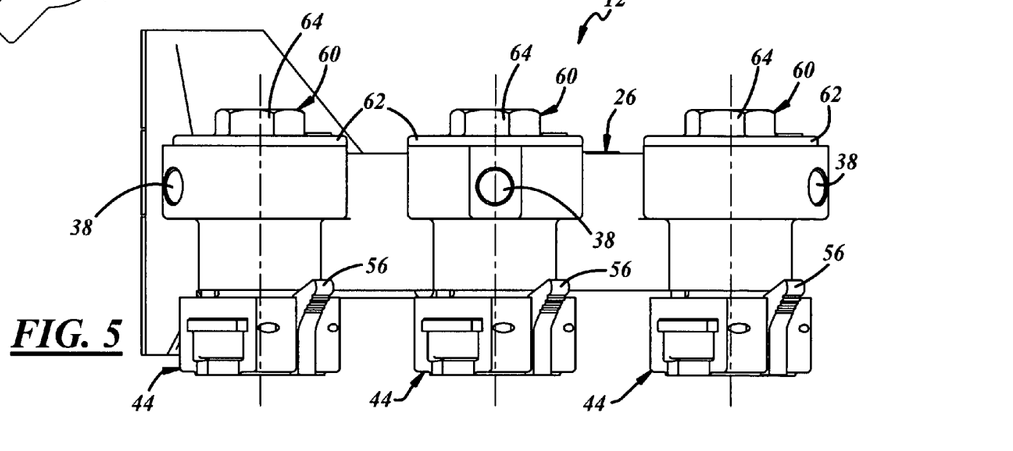
FIG. 5 is a side elevational view of the blowhead arm assembly in FIGS. 1-4.
Figure 6:
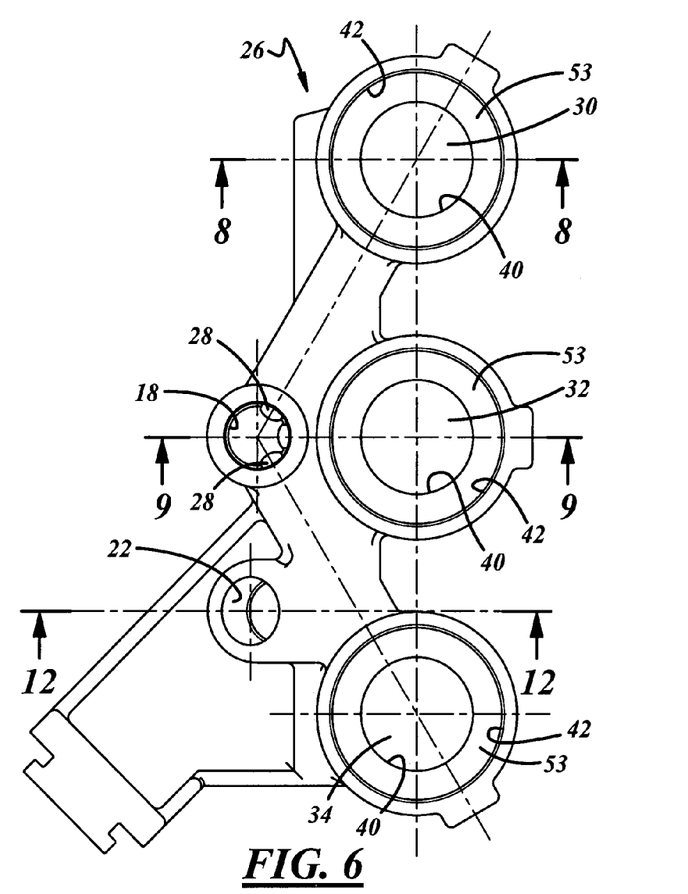
FIG. 6 is a top plan view of the blowhead arm body in the assembly of FIGS. 1-5.
Figure 7:
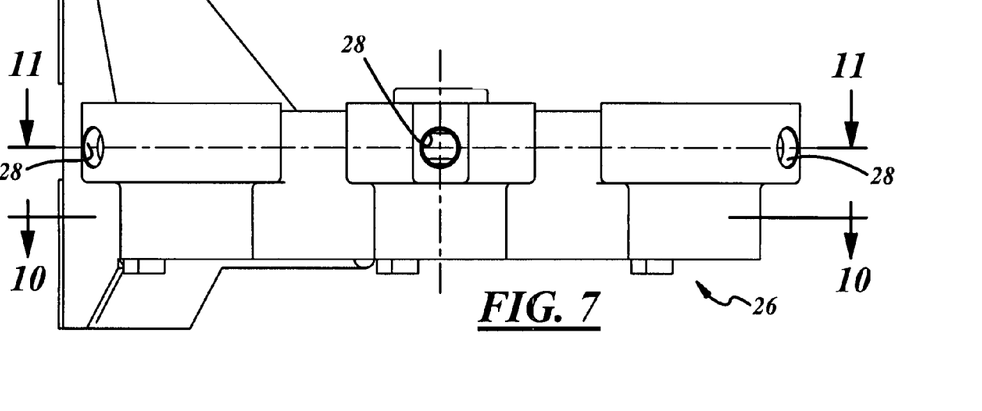
FIG. 7 is a side elevational view of the blowhead arm body in FIG. 6.

Each lateral passage 30-34 in blow arm body 26 has a first or lower end 40 (with respect to the direction of orientation of the blow arm assembly over the blow molds illustrated in FIG. 1). The second or upper end 42 of each lateral passage 30-34 has one or more internal threads and is of larger diameter than lower or first end 40. A blowhead chuck 44 is slidably received in each first passage end 40, preferably by being slidably supported by a sleeve bearing 46 (FIG. 3). The mounting arrangement of blowhead chucks 44 (and blowheads 54) is the same in each lateral passage 30-34, so only the mounting in passage 32 will be described detail in connection with FIG. 3. Each blowhead chuck 44 has a hollow stem 48 slidably carried by bearing 46, with a series of annular seals 50 being spaced lengthwise along stem 48 and engaging bearing 46. The upper end of each blowhead chuck stem is captured by a removable ring 52 that engages a shoulder 53 in passage 32. The lower end of each blowhead chuck 44 is enlarged to receive a removable blowhead 54. The particular blowhead 54 illustrated in the drawings is an isolated finish cooling blowhead, although other types of blowheads can be employed in conjunction with the blowhead arm assembly of the present disclosure as previously noted. Chuck 44 preferably has a lock 56 that releasably captures blowhead 54 against a wear plate 58.

Figures 11, 12, 13:
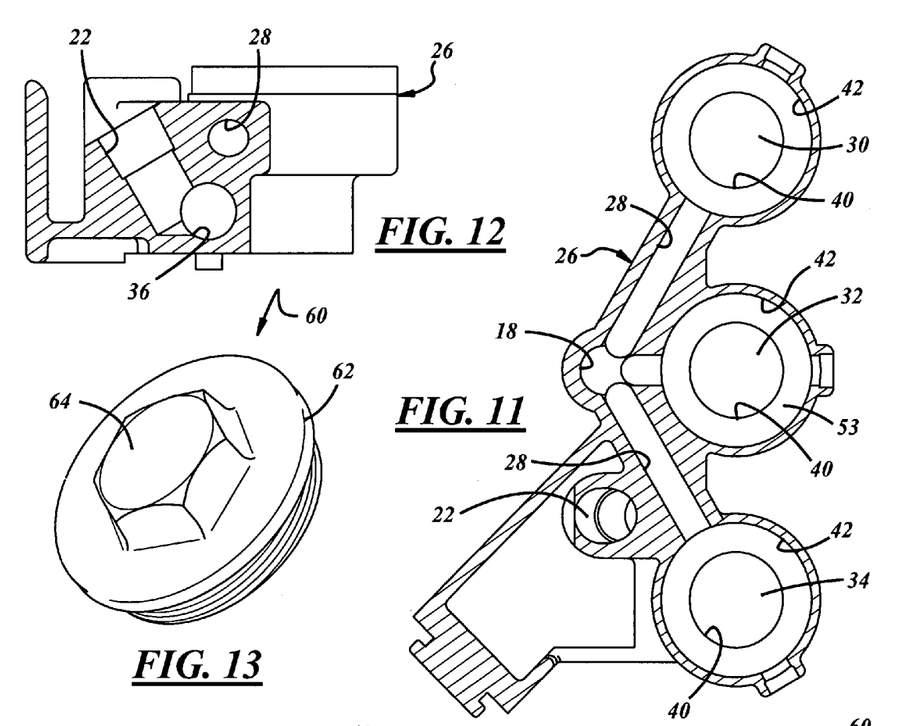
FIG. 12 is a sectional view taken substantially along the line 12-12 in FIG. 6.
FIG. 13 is a perspective view of a blowhead arm cap in the blowhead arm assembly of FIGS. 1-5.

A cap 60 has a circular body with one or more external threads (FIGS. 3 and 13) removably received into second or upper end 42 of each lateral passage 30-34. Cap 60 has an external annular shoulder 62 that abuts the outer surface of blowhead arm body 26 at the fully threaded position of the cap. Cap 60 also preferably has an external boss 64, preferably having a hexagonal external periphery, for engagement by a suitable tool for threading cap 60 into and out of upper end 42 of each lateral passage 30-34. Cap 60 may be an investment casting. A coil spring 66 is captured in compression between each cap 60 and a shoulder 68 on blowhead chuck 44 to bias each blowhead chuck in a direction out of the associated lateral passage and away from cap 60. In the exemplary embodiment illustrated in FIG. 3, coil spring 66 engages a washer 70 that abuts shoulder 68. A second coil spring 72 is captured in compression between washer 70 and wear plate 58 to bias blowhead 54 downwardly for resilient engagement with the upper end of an associated blow mold 16 (FIG. 1).

Figures 8, 9, 10:
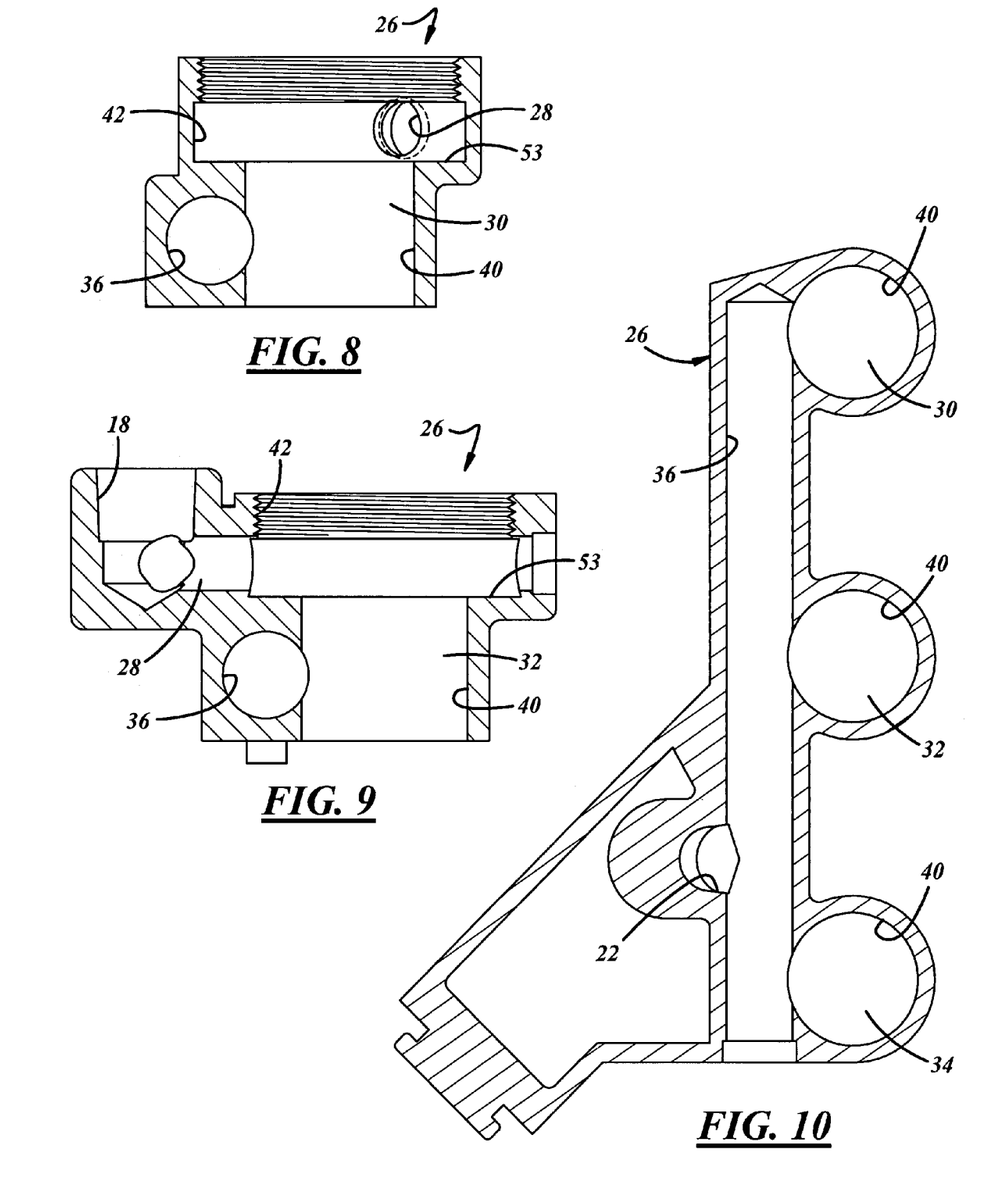
FIGS. 8-9 are sectional views taken substantially along the respective lines 8-8 and 9-9 in FIG. 6.
FIGS. 10 and 11 are sectional views taken substantially along the respective lines 10-10 and 11-11 in FIG. 7.

Longitudinal blow air passage 28 intersects lateral passage 32 (and passages 30, 34) near lateral passage first or upper end 42 beneath cap 60, as shown in FIGS. 3, 8 and 9. Blow air thus is directed from longitudinal passage 28 to lateral passage 32 (and lateral passages 30, 34), through springs 66, 72, wear plate 58 and tube 74 of blowhead 54 into the neck finish of a glass parison (not shown) in an associated blow mold. In the meantime, finish cooling air is directed by longitudinal passage 36 into lateral passage 32 (and lateral passages 30, 34), through passages 76 in blowhead chuck 44, and through wear plate 58 into isolated finish cooling passages 76 in blowhead 54. If isolated finish cooling is not desired, blowhead 54 can be replaced by a blowhead that takes finish cooling air from the blow air centrally directed into the blowhead. Alternatively, blowhead chuck 54 can be replaced by one that takes finish cooling air from the blow air directed through the central passage of the blowhead chuck. It will be noted in this connection that blowhead chuck 44 can be readily removed for maintenance or replacement by simply removing cap 60 and then removing ring 52 that holds blowhead chuck 44 on blowhead arm casting 26 inasmuch as ring 52 has a lesser diameter than upper end 42 of passage 32.

Figure 14:
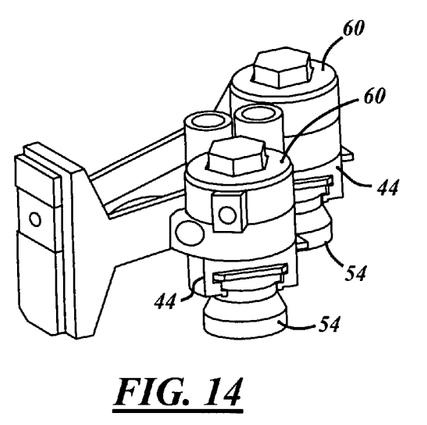
FIGS. 14 and 15 are perspective views similar to that of FIG. 2 but showing blowhead arm assemblies for use in conjunction with two or four blowheads respectively.
Figure 15:
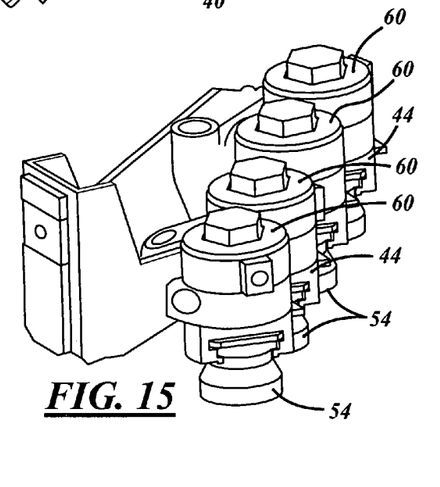

Although the exemplary embodiment of the present disclosure has presented in conjunction with a blowhead arm assembly that includes three blowhead chucks for a so-called triple glassware forming machine, the principles of the present disclosure can be applied equally as well to double machines having two blow molds in each machine section (FIG. 14) or to so-called quad machines having four blow molds in each machine section (FIG. 15). All components in the blowhead arm assemblies of FIGS. 14 and 15 preferably are the same as previously described with the exception of the blowhead arm bodies.

There thus has been disclosed a blowhead arm assembly for a glassware forming machine which fully satisfies all of the objects and aims previously set forth. The blowhead arm assembly of the present disclosure has a reduced number of parts and is easier to assemble than blowhead arm assemblies of the prior art. The amount of required machining is reduced. The blowhead arm assembly has been disclosed in conjunction with exemplary embodiments, and various modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A glassware forming machine blowhead arm assembly that includes:
   a one-piece blowhead arm body having at least one longitudinal air passage and a plurality of lateral air passages connected to said one longitudinal air passage,
   a plurality of blowhead chucks removably received in first ends of said lateral passages, including lower ends, and hollow stems slidably received in said first ends of said lateral passages and having internal shoulders and upper ends,
   a plurality of removable rings on said upper ends of said hollow stems of said blowhead chucks to capture said upper ends and engage shoulders in said lateral air passages,
   a plurality of removable blowheads received in said lower ends of said blowhead chucks,
   a plurality of wear plates disposed between said blowheads and said blowhead chucks,
   a plurality of caps threaded into second ends of said lateral passages spaced from said blowhead chucks,
   a plurality of washers in said hollow stems abutting said internal shoulders,
   a plurality of first springs captured in compression between said caps and said plurality of washers in said hollow stems of said blowhead chucks to bias said blowhead chucks in a direction away from said caps and out of said lateral passages, and
   a plurality of second springs captured in compression between said washers and said wear plates,
   wherein blow air flows through said lateral air passages, through said springs, said wear plates, and said blowheads.

2. The blowhead arm assembly set forth in claim 1 wherein said at least one longitudinal passage is machined into said blowhead arm body, and wherein said assembly includes at least one expansion plug received in an end of said at least one longitudinal passage closing said end of said longitudinal passage.

3. The blowhead arm assembly set forth in claim 1 wherein said blowhead arm body includes a second longitudinal air passage separate from said one longitudinal air passage and connected to said lateral passages, and separate air inlet ports connected to said longitudinal air passages.

4. The blowhead arm assembly set forth in claim 3 wherein each of said longitudinal air passages is machined into said blowhead arm body, and wherein said assembly includes at least one expansion plug received in an end of each of said longitudinal passages closing said ends of said longitudinal passages.

5. The blowhead arm assembly set forth in claim 1 wherein each cap has a larger diameter than the stem of the opposing chuck so that said chuck can be removed from said assembly by removal of said cap and said ring.

6. The blowhead arm assembly set forth in claim 5 wherein each said chuck has air passages operatively connected to said first and second longitudinal air passages.

7. The blowhead arm assembly set forth in claim 1 wherein each of said caps includes a circular body having external threads and a radially outwardly extending shoulder for abutting an opposing surface of said blowhead arm body when said cap is fully threaded into said second end of said lateral air passage, and an external boss on said body for engagement by a tool to thread or unthread said cap from said blowhead arm body.

8. The blowhead arm assembly set forth in claim 1 wherein said body is a machined casting.

9. The blowhead arm assembly set forth in claim 1 wherein said at least one longitudinal air passage includes a first passage connected to a blow air input port and a second passage connected to a cooling air input port, which is closed by an expansion plug when finish cooling is not needed.

10. The blowhead arm assembly set forth in claim 1 wherein said second end is of larger internal diameter than said first end.

11. The blowhead arm assembly set forth in claim 1 wherein said blowhead arm body includes at least one second longitudinal air passage separate from said at least one longitudinal air passage and connected to said plurality of lateral air passages, and separate air inlet ports connected to said longitudinal air passages, and wherein cooling air flows through said at least one second longitudinal air passage and said lateral air passages, and through passages in said blowhead chucks, through said wear plate, and into cooling passages in said blowheads.

* * * * *